April 14, 1942.  F. E. ALTMAN  2,279,384
PHOTOGRAPHIC OBJECTIVE
Filed Jan. 9, 1941  2 Sheets-Sheet 1

FIG.1

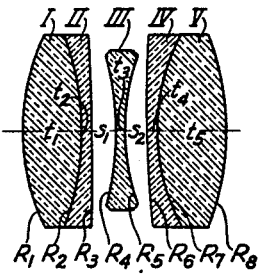

| EXAMPLE: 1 | f/3.3 | f=100mm. | COVERING POWER 33° |
|---|---|---|---|
| $P=.0033$ | $P_2\Delta=.0114$ | $P_7\Delta=.0335$ | $P_7(\Delta-t_5)=.0222$ |

| LENS | $N_D$ | $\nu$ | RADII | THICKNESSES |
|---|---|---|---|---|
| I | 1.611 | 57.2 | $R_1 = +\ 43.2$ mm. | $t_1 = 11.42$ mm. |
| II | 1.573 | 57.4 | $R_2 = -\ 52.9$ mm. | $t_2 = 2.00$ mm. |
|  |  |  | $R_3 = -\ 4806.3$ mm. | $s_1 = 4.94$ mm. |
| III | 1.605 | 38.2 | $R_4 = -\ 55.0$ mm. | $t_3 = 1.71$ mm. |
|  |  |  | $R_5 = +\ 43.1$ mm. | $s_2 = 4.74$ mm. |
| IV | 1.649 | 33.8 | $R_6 = +\ 651.9$ mm. | $t_4 = 2.00$ mm. |
| V | 1.744 | 45.8 | $R_7 = +\ 39.0$ mm. | $t_5 = 13.43$ mm. |
|  |  |  | $R_8 = -\ 51.0$ mm. | $\Delta = 39.64$ mm. |

FIG.2

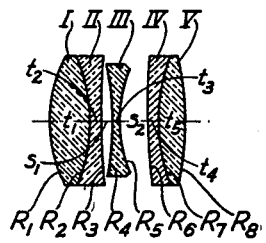

| EXAMPLE: 4 | f/4.5 | f=100mm. | COVERING POWER 26° |
|---|---|---|---|
| $P=.0019$ | $P_2\Delta=.0126$ | $P_7\Delta=.0379$ | $P_7(\Delta-t_5)=.0305$ |

| LENS | $N_D$ | $\nu$ | RADII | THICKNESSES |
|---|---|---|---|---|
| I | 1.611 | 57.2 | $R_1 = +\ 27.3$ mm. | $t_1 = 8.12$ mm. |
| II | 1.573 | 57.5 | $R_2 = -\ 32.1$ mm. | $t_2 = 2.28$ mm. |
|  |  |  | $R_3 = +\ 229.9$ mm. | $s_1 = 1.86$ mm. |
| III | 1.605 | 38.2 | $R_4 = -\ 70.4$ mm. | $t_3 = 1.53$ mm. |
|  |  |  | $R_5 = +\ 26.5$ mm. | $s_2 = 5.44$ mm. |
| IV | 1.605 | 38.2 | $R_6 = +\ 632.6$ mm. | $t_4 = 2.28$ mm. |
| V | 1.744 | 45.8 | $R_7 = +\ 35.0$ mm. | $t_5 = 5.22$ mm. |
|  |  |  | $R_8 = -\ 62.5$ mm. | $\Delta = 26.73$ mm. |

FRED E. ALTMAN
INVENTOR

BY Newton M. Perrins
ATTORNEY

April 14, 1942.　　　F. E. ALTMAN　　　2,279,384
PHOTOGRAPHIC OBJECTIVE
Filed Jan. 9, 1941　　　2 Sheets-Sheet 2

FIG. 3

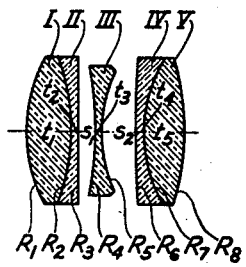

| EXAMPLE: 7 | $f/3.5$ | $f=100mm.$ | COVERING POWER 22° | |
|---|---|---|---|---|
| $P=.0027$ | $P_2\Delta=.0127$ | $P_7\Delta=.0439$ | $P_7(\Delta-t_5)=.0329$ | |
| LENS | $N_D$ | $\nu$ | RADII | THICKNESSES |
| I | 1.611 | 57.2 | $R_1 = +\ 29.5$ mm. | $t_1 = 8.87$ mm. |
| II | 1.573 | 57.4 | $R_2 = -\ 38.3$ mm. | $t_2 = 1.50$ mm. |
|  |  |  | $R_3 = \infty$ | $s_1 = 3.38$ mm. |
| III | 1.605 | 38.2 | $R_4 = -\ 62.6$ mm. | $t_3 = 1.77$ mm. |
|  |  |  | $R_5 = +\ 26.5$ mm. | $s_2 = 6.75$ mm. |
| IV | 1.525 | 54.8 | $R_6 = +758.3$ mm. | $t_4 = 1.77$ mm. |
| V | 1.616 | 55.1 | $R_7 = +\ 27.0$ mm. | $t_5 = 8.00$ mm. |
|  |  |  | $R_8 = -\ 47.3$ mm. | $\Delta = 32.04$ mm. |

FIG. 4

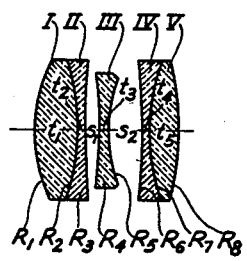

| EXAMPLE: 10 | $f/3.5$ | $f=100mm.$ | COVERING POWER 26° | |
|---|---|---|---|---|
| $P=.0025$ | $P_2\Delta=.0098$ | $P_7\Delta=.0354$ | $P_7(\Delta-t_5)=.0280$ | |
| LENS | $N_D$ | $\nu$ | RADII | THICKNESSES |
| I | 1.611 | 57.2 | $R_1 = +\ 30.7$ mm. | $t_1 = 8.49$ mm. |
| II | 1.573 | 57.4 | $R_2 = -\ 44.6$ mm. | $t_2 = 1.55$ mm. |
|  |  |  | $R_3 = +727.1$ mm. | $s_1 = 2.86$ mm. |
| III | 1.605 | 38.2 | $R_4 = -\ 71.3$ mm. | $t_3 = 1.80$ mm. |
|  |  |  | $R_5 = +\ 29.9$ mm. | $s_2 = 6.54$ mm. |
| IV | 1.605 | 38.2 | $R_6 = -751.7$ mm. | $t_4 = 1.59$ mm. |
| V | 1.744 | 45.7 | $R_7 = +\ 40.5$ mm. | $t_5 = 6.00$ mm. |
|  |  |  | $R_8 = -\ 56.7$ mm. | $\Delta = 28.83$ mm. |

FRED E. ALTMAN
INVENTOR

BY Newton M. Perrins

ATTORNEY

Patented Apr. 14, 1942

2,279,384

UNITED STATES PATENT OFFICE 2,279,384

PHOTOGRAPHIC OBJECTIVE

Fred E. Altman, Rochester, N. Y., assignor to Eastman Kodak Company, Rochester, N. Y., a corporation of New Jersey Application January 9, 1941, Serial No. 373,785

18 Claims. (Cl. 88—57)

This invention relates to photographic objectives and particularly to modified triplets.

It is an object of the invention to provide a highly corrected photographic objective with improved spherical aberration, chromatic aberration, curvature of field, sine condition, coma, distortion, Petzval condition, etc.

It is an object of the invention to provide a photographic objective with wide (high) covering power and good definition.

It is a particular object of the invention to provide a lens with low astigmatism.

It is the main object of the invention to provide a lens highly corrected for upper and lower rim ray agreement with the principal ray. Lack of such agreement may appear either as coma or, if the rim rays are equally distributed about the principal ray, as pure oblique spherical aberration.

It is an object of the preferred embodiment of the invention to minimize zonal spherical aberration.

It is realized that many workers in the field of optics have considered the possibility of modifying triplets in various ways to get improved quality. The compounding of both of the positive components either with the negative component simple or also compound, has been investigated, usually with a view to correcting color. Most of the lenses resulting from such developments have long ago been superseded for various reasons. Some of them have a superficial similarity to those of the present invention, but the very fact that my efforts have been to obtain better agreement in both the upper and lower rim rays and better spherical aberration correction than is possible with such prior arrangements, gives my lenses distinctive characteristics capable of being defined as precisely as anything in lens design. Examples of such prior art appear in U. S. 716,035; U. S. 765,006; U. S. 766,036; all to Harting, U. S. 1,421,156 Booth; U. S. 1,939,098, Berek; French 509,173, and 509,198, S. A. d'Etablissement Optis; German 342,937 Voigtlander; German 396,823 Steinheil; and German 526,307 and 8, Leitz.

According to the present invention, I correct most of the aberrations by following the usual laws of lens design and in addition, I correct for rim ray disagreement by a cemented surface in each of the positive components, i. e. the components must be doublets. I have found that this requires both of these cemented surfaces to be convex inward to give the proper differential in power as the margins of the lenses are approached. Furthermore, since I am employing the power of these surfaces in this way, the change in index at each surface must be sufficient to give the optical power required and there would be no such power if the break in index were substantially zero as is sometimes employed when color correction only is desired. Thus the difference in refractive index must always be greater than .025 and the doublets must have a negative element on the inside of a bi-convex positive element. Whether the inside surfaces, i. e., those toward the negative component, of the doublets are positive, plano or negative depends on the balance of powers and becomes critical only when the invention is applied to some specific quality of lens, i. e., some lens of specific covering power, aperture, etc.

The present invention is mainly concerned with the correction of lower rim rays by the cemented surface of the front doublet. The curvature which this surface must have depends on the index break, i. e., the difference in indices of refraction, at this surface and also on the overall length of the lens. This latter factor may be thought of as being due to the leverage afforded the power applied in the surface in question—an optical basis for such theory being that the longer the lens, the less the power required to bring the rim rays into agreement. The need for rim ray correction depends on the aperture and on the covering power both of which also affect the overall length; thus there are various explanations for this correlation between power required and the overall length. The reason this surface works to correct rim rays is because it has disproportionate zonal power. Since both high aperture and wide covering power lenses require greater rim ray correction the fact that increased aperture is usually accompanied by increased overall length whereas increased covering power is usually associated with decreased overall length, seems at first sight to discredit the constancy of the relationship between power required and overall length. However, I have found by actual design and testing that $$\frac{(N_{II}-N_{I})}{N_{I}N_{II}R_{2}}\Delta$$

must be between .006 and .016 and preferably between .008 and .013 if useful correction of lower rim rays is to be obtained. In fact, the rule that this factor should be held within these narrow limits holds for a surprising number of types of lenses e. g. wide angle lenses, narrow angle lenses, extra long focal length lenses such as aerial lenses, lenses corrected for finite conjugates, et., etc. In this expression $N_I$ and $N_{II}$ are the indices of refraction of the positive and negative elements of the front doublet, $R_2$ is the radius of curvature of the cemented surface in this doublet and $\Delta$ is the overall length of the lens. $N_I$ is greater than $N_{II}$ but since $R_2$ is concave to the incident light, i. e., concave to the front, it is considered negative and hence the expression is positive. This expression is the Petzval power for the surface times the overall length of the lens.

As is customary, the term "front" is applied to the side of the lens facing the longer conjugate, i. e., facing the subject when used on a camera.

The invention as just described is most useful when combined with a preferred degree of correction of upper rim rays at the cemented surface of the rear doublet which therefore has to be convex to the front and have a break in index of at least .025. In the preferred embodiment, the Petzval power of this latter surface times the overall length or better still times the overall length minus the thickness of the rear element must be held within certain limits, i. e., $$\frac{(N_{V}-N_{IV})}{N_{IV}N_{V}R_{7}}\Delta$$

must be between .025 and .075 and preferably between .027 and .040 or $$\frac{(N_{V}-N_{IV})}{N_{IV}N_{V}R_{7}}(\Delta-t_{5})$$

must be between .020 and .035 where $N_{IV}$ and $N_V$ are the indices of refraction of the negative and positive elements respectively of the rear doublet, $R_7$ is the radius of curvature of the cemented surface in this doublet $\Delta$ is the overall length as described above and $t_5$ is the thickness of the rear element, i. e., the positive element of the doublet.

Before the description is given of some of the other preferred embodiments, a summary of the theory involved will be outlined from a viewpoint slightly different from that above.

By the use of collective cemented surfaces convex toward the diaphragm in both the front and rear components, a benefit is obtained not only for the correction of spherical aberration for the axial pencil of light rays, but, according to the above rule, also for a reduction of spherical aberration (more correctly, the reduction of the overcorrection of spherical aberration) of the oblique pencil. This results in a marked improvement in the oblique images. The specific action of these two cemented surfaces as far as the present invention is concerned is such that the front cemented surface affects the lower rim rays and the rear one affects the upper rim rays.

A detailed study of the individual action of each surface of a compound lens on various rays in a family constituting an oblique beam, indicates that some surfaces affect all the rays substantially the same way, i. e., in a manner proportional to the height of the ray on that surface whereas other surfaces have a decided disproportionate effect—a disproportionate refraction on certain portions of the oblique pencil of rays. Such an analysis for an air spaced triplet shows that both surfaces of the central negative element have this disturbing influence to a marked degree, the front surface having a disproportionate action on the lower rim rays of an oblique pencil coming from below the axis and the rear surface having a disproportionate action on the upper rim rays. Incidentally both of these actions are in the direction of over correcting spherical aberration of the outer or marginal zones. In order to obtain a high degree of correction of oblique images, it is necessary to balance these disproportionate effects by surfaces of opposite effect.

It happens that the front surface of the front component tends to counteract the effect of the rear surface of the negative component, and a nice balance between these two effects i. e. a correction for the residual error is obtained by careful selection of the cemented surface in the rear component. Similarly various surfaces including the front surface of the negative component affect the lower rim rays and in the absence of the present invention the residual disagreement between these lower rim rays and the principal rays is not corrected since the surfaces are selected for the correction of other aberrations. By the present invention, this residual disagreement is corrected by proper selection of curvature of, and index change at, a cemented surface in the front component.

Thus may analysis involves directly the dependence of ray deviation on the angle of incidence and the position thereof on each refractive surface. I have found that the cemented surfaces in the front and rear components are so located in the optical system as to be ideal for correction of the disproportionate effects shown up by my analysis. And as pointed out above, the design of these surfaces must follow certain established relationships if the advantages of the invention are to be realized.

By way of definition, the lower rim rays are those limited or defined by the front window of the system and the upper rim rays are defined by the rear window. In an oblique pencil of parallel rays coming up to the front surface of the lens from below the axis, the lowest ray is a lower rim ray and the top ray is an upper rim ray.

In addition to all this general theory and the definition of the main features of the invention, I have found that the spherical aberration and particularly the residual or zonal spherical aberration is improved greatly if a flint glass having a relatively high index of refraction is selected for the negative component. If this involves any change in dispersion, the correction for achromatism is distributed accordingly. That is, all tendencies toward reduction of spherical aberration due to having additional surfaces to which to delegate some of the necessary work (power), are at least partially counteracted when the middle component of the triplet has a low index of refraction. While a high index negative component in a modified triplet is not entirely novel, the advantages just mentioned are mainly due to the combination of this feature with the main features of the present invention. This method of zonal spherical aberration control as well as the correction of rim rays has apparently not previously been recognized probably because no one was aware of the advantages of assigning the additional aberration correcting work to the cemented surfaces as I have done and redistributing the powers and color correction. While this high index middle component constitutes a preferred embodiment of my invention, it is not necessary since the correction of rim rays is present whether the negative component is high or low in index.

Whether this negative component of the triplet is compound or not is also immaterial to the present invention. Such modifications wherein it is compound, might be of value in some other connection, i. e., for correcting some other aberration as in the patents listed above, but since the nice balance of corrections as obtained by the present invention is most pronounced when the middle component is a single element, the simple form constitutes a preferred embodiment.

When the powers of my type lens are arranged to give wide covering power and flat field, the astigmatism can be greatly reduced by using a glass whose index of refraction is greater than 1.7 in the rear element of the rear component and hence a preferred embodiment of the invention employs just such a glass. Throughout this specification and claims the term index of refraction is used in the usual way to refer to the index when measured for the D line of the spectrum.

Since I employ the cemented surface of the front component almost entirely for correction of lower rim rays, zonal spherical aberration and field and not at all for color, the two elements thereof may have the same dispersive index. In fact I have found that such a limitation fits in well with field correction. However, differences in dispersive index are obviously permissible if the effect on color is taken into account in the usual way. In the accompanying drawings there are shown four types of lenses all according to preferred embodiments of the present invention.

Fig. 1 shows a wide angle f/3.5 lens, specifically Example 1 as given below.

Fig. 2 is a fairly wide angle f/4.5, specifically Example 4 given below.

Fig. 3 shows a normal covering power f/3.5 lens, specifically Example 7 given below.

Fig. 4 is similar to Fig. 3 with improved astigmatism, etc., specifically Example 10 given below.

The following are some of the many lenses I have designed to incorporate the preferred embodiments of my invention. They are given together for convenience and are separately discussed in detail afterwards.

Example 1 f/3.3    f=100 mm.    Covering power 33°

$P=.0033$   $P_2\Delta=.0114$   $P_7\Delta=.0335$   $P_7(\Delta-t_5)=.0222$

| Lens | $N_D$ | $\nu$ | Radii | Thicknesses |
|---|---|---|---|---|
| I | 1.611 | 57.2 | $R_1=+43.2$ mm. | $t_1=11.42$ mm. |
| II | 1.573 | 57.4 | $R_2=-52.9$ | $t_2=2.00$ |
|  |  |  | $R_3=-4806.3$ | $S_1=4.94$ |
| III | 1.605 | 38.2 | $R_4=-55.0$ | $t_3=1.71$ |
|  |  |  | $R_5=+43.1$ | $S_2=4.74$ |
| IV | 1.649 | 33.8 | $R_6=+651.9$ | $t_4=2.00$ |
| V | 1.744 | 45.8 | $R_7=+39.0$ | $t_5=13.43$ |
|  |  |  | $R_8=-51.0$ | $\Delta=39.64$ |

Example 2 f/3.3    f=100 mm.    Covering power 33°

$P=.0045$   $P_2\Delta=.0113$   $P_7\Delta=.02$   $P_7(\Delta-t_5)=.0167$

| Lens | $N_D$ | $\nu$ | Radii | Thicknesses |
|---|---|---|---|---|
| I | 1.611 | 57.2 | $R_1=+3.2$ mm. | $t_1=11.42$ mm. |
| II | 1.573 | 57.4 | $R_2=-52.9$ | $t_2=2.00$ |
|  |  |  | $R_3=-4806.3$ | $S_1=4.94$ |
| III | 1.605 | 38.2 | $R_4=-55.0$ | $t_3=1.71$ |
|  |  |  | $R_5=+43.1$ | $S_2=4.14$ |
| IV | 1.525 | 33.8 | $R_6=+173.4$ | $t_4=2.00$ |
| V | 1.620 | 45.5 | $R_7=+60.4$ | $t_5=13.43$ |
|  |  |  | $R_8=-45.6$ | $\Delta=39.61$ |

Example 3 f/6.3    f=100 mm.    Covering power 22°

$P=.0029$   $P_2\Delta=.0109$   $P_7\Delta=.0495$   $P_7(\Delta-t_5)=.0336$

| Lens | $N_D$ | $\nu$ | Radii | Thicknesses |
|---|---|---|---|---|
| I | 1.611 | 57.2 | $R_1=+44.6$ mm. | $t_1=13.78$ mm. |
| II | 1.573 | 57.4 | $R_2=-69.7$ | $t_2=2.63$ |
|  |  |  | $R_3=-353.0$ | $S_1=6.61$ |
| III | 1.605 | 38.2 | $R_4=-51.4$ | $t_3=2.63$ |
|  |  |  | $R_5=+38.8$ | $S_2=5.76$ |
| IV | 1.649 | 33.8 | $R_6=+559.6$ | $t_4=2.63$ |
| V | 1.744 | 45.5 | $R_7=+33.4$ | $t_5=16.05$ |
|  |  |  | $R_8=-50.3$ | $\Delta=50.09$ |

Example 4

$P=.0019$   $P_2\Delta=.0126$   $P_7\Delta=.0379$   $P_7(\Delta-t_5)=.0305$ f/4.5    f=100 mm.    Covering power 26°

| Lens | $N_D$ | $\nu$ | Radii | Thicknesses |
|---|---|---|---|---|
| I | 1.661 | 57.2 | $R_1=+27.3$ mm. | $t_1=8.12$ mm. |
| II | 1.573 | 57.5 | $R_2=-32.1$ | $t_2=2.28$ |
|  |  |  | $R_3=+229.9$ | $S_1=1.86$ |
| III | 1.605 | 38.2 | $R_4=-70.4$ | $t_3=1.53$ |
|  |  |  | $R_5=+26.5$ | $S_2=5.44$ |
| IV | 1.605 | 38.2 | $R_6=+632.6$ | $t_4=2.28$ |
| V | 1.744 | 45.8 | $R_7=+35.0$ | $t_5=5.22$ |
|  |  |  | $R_8=-62.5$ | $\Delta=26.73$ |

Example 5 f/4.5    f=100 mm.    Covering Power 22°

$P=.0019$   $P_2\Delta=.0120$   $P_7\Delta=.0346$   $P_7(\Delta-t_5)=.0276$

| Lens | $N_D$ | $\nu$ | Radii | Thicknesses |
|---|---|---|---|---|
| I | 1.611 | 57.2 | $R_1=+26.5$ mm. | $t_1=6.58$ mm. |
| II | 1.573 | 57.5 | $R_2=-32.2$ | $t_2=1.09$ |
|  |  |  | $R_3=+218.3$ | $S_1=3.25$ |
| III | 1.605 | 38.2 | $R_4=-68.2$ | $t_3=1.53$ |
|  |  |  | $R_5=+26.0$ | $S_2=6.84$ |
| IV | 1.605 | 38.2 | $R_6=+685.6$ | $t_4=1.09$ |
| V | 1.744 | 45.8 | $R_7=+36.6$ | $t_5=5.06$ |
|  |  |  | $R_8=-60.7$ | $\Delta=25.44$ |

Example 6 f/4.5    f=100 mm.    Covering Power 26°

$P=.0022$   $P_2\Delta=.0124$   $P_7\Delta=.0426$   $P_7(\Delta-t_5)=.0347$

| Lens | $N_D$ | $\nu$ | Radii | Thicknesses |
|---|---|---|---|---|
| I | 1.611 | 57.2 | $R_1=+28.3$ mm. | $t_1=8.06$ mm. |
| II | 1.573 | 57.5 | $R_2=-34.3$ | $t_2=2.26$ |
|  |  |  | $R_3=+280.1$ | $S_1=1.96$ |
| III | 1.605 | 38.2 | $R_4=-72.7$ | $t_3=2.50$ |
|  |  |  | $R_5=+27.4$ | $S_2=5.84$ |
| IV | 1.575 | 41.4 | $R_6=+400.9$ | $t_4=2.27$ |
| V | 1.744 | 45.8 | $R_7=+40.5$ | $t_5=5.19$ |
|  |  |  | $R_8=-68.0$ | $\Delta=28.08$ |

Example 7 f/3.5    f=100 mm.    Covering Power 22°

P=.0027    $P_2\Delta$=.0127    $P_7\Delta$=.0416    $P_7(\Delta-t_5)$=.0318

| Lens | $N_D$ | $\nu$ | Radii | Thicknesses |
|---|---|---|---|---|
| I | 1.611 | 57.2 | $R_1$=+29.5 mm. | $t_1$=8.87 mm. |
| II | 1.573 | 57.4 | $R_2$=−38.3 | $t_2$=1.50 |
|  |  |  | $R_3$=∞ | $S_1$=3.38 |
| III | 1.605 | 38.2 | $R_4$=−62.6 | $t_3$=1.77 |
|  |  |  | $R_5$=+26.5 | $S_2$=6.75 |
| IV | 1.525 | 54.8 | $R_6$=+758.3 | $t_4$=1.77 |
| V | 1.616 | 55.1 | $R_7$=+27.0 | $t_5$=8.00 |
|  |  |  | $R_8$=−47.3 | $\Delta$=32.04 |

Example 8 f/3.7    f=100 mm.    Covering power 22°

P=.0028    $P_2\Delta$=.0121    $P_7\Delta$=.0416    $P_7(\Delta-t_5)$=.0307

| Lens | $N_D$ | $\nu$ | Radii | Thicknesses |
|---|---|---|---|---|
| I | 1.611 | 57.2 | $R_1$=+29.3 mm. | $t_1$=7.65 mm. |
| II | 1.573 | 57.5 | $R_2$=−38.8 | $t_2$=1.26 |
|  |  |  | $R_3$=+1100.5 | $S_1$=3.82 |
| III | 1.605 | 38.2 | $R_4$=−63.6 | $t_3$=1.80 |
|  |  |  | $R_5$=+26.8 | $S_2$=6.45 |
| IV | 1.525 | 54.8 | $R_6$=+767.3 | $t_4$=1.80 |
| V | 1.616 | 55.1 | $R_7$=+27.4 | $t_5$=8.10 |
|  |  |  | $R_8$=−46.9 | $\Delta$=30.88 |

Example 9 f/3.5    f=100 mm.    Covering power 22°

P=.0019    $P_2\Delta$=.0122    $P_7\Delta$=.0358    $P_7(\Delta-t_5)$=.0294

| Lens | $N_D$ | $\nu$ | Radii | Thicknesses |
|---|---|---|---|---|
| I | 1.617 | 55.0 | $R_1$=+30.5 mm. | $t_1$=8.68 mm. |
| II | 1.573 | 56.8 | $R_2$=−33.9 | $t_2$=1.47 |
|  |  |  | $R_3$=+1155.0 | $S_1$=2.60 |
| III | 1.605 | 38.0 | $R_4$=−59.2 | $t_3$=1.30 |
|  |  |  | $R_5$=+29.6 | $S_2$=7.19 |
| IV | 1.605 | 38.0 | $R_6$=−235.0 | $t_4$=1.30 |
| V | 1.744 | 45.7 | $R_7$=+38.0 | $t_5$=4.86 |
|  |  |  | $R_8$=−48.9 | $\Delta$=27.40 |

Example 10 f/3.5    f=100 mm.    Covering power 26°

P=.0025    $P_2\Delta$=.0098    $P_7\Delta$=.0354    $P_7(\Delta-t_5)$=.0280

| Lens | $N_D$ | $\nu$ | Radii | Thicknesses |
|---|---|---|---|---|
| I | 1.611 | 57.2 | $R_1$=+30.7 mm. | $t_1$=8.49 mm. |
| II | 1.573 | 57.5 | $R_2$=−44.6 | $t_2$=1.55 |
|  |  |  | $R_3$=+727.1 | $S_1$=2.86 |
| III | 1.605 | 38.2 | $R_4$=−71.3 | $t_3$=1.80 |
|  |  |  | $R_5$=+29.9 | $S_2$=6.54 |
| IV | 1.605 | 38.2 | $R_6$=−751.7 | $t_4$=1.59 |
| V | 1.744 | 45.7 | $R_7$=+40.5 | $t_5$=6.00 |
|  |  |  | $R_8$=−56.7 | $\Delta$=28.83 |

Example 11 f/4.5    f=100 mm.    Covering power 26°

P=.0017    $P_2\Delta$=.0089    $P_7\Delta$=.0303    $P_7(\Delta-t_5)$=.0250

| Lens | $N_D$ | $\nu$ | Radii | Thicknesses |
|---|---|---|---|---|
| I | 1.617 | 55.0 | $R_1$=+23.9 mm. | $t_1$=5.19 mm. |
| II | 1.573 | 57.4 | $R_2$=−39.4 | $t_2$=1.52 |
|  |  |  | $R_3$=+132.2 | $S_1$=1.51 |
| III | 1.605 | 38.0 | $R_4$=−84.6 | $t_3$=1.77 |
|  |  |  | $R_5$=+23.4 | $S_2$=4.96 |
| IV | 1.617 | 38.5 | $R_6$=−771.0 | $t_4$=1.52 |
| V | 1.744 | 45.8 | $R_7$=+29.6 | $t_5$=3.45 |
|  |  |  | $R_8$=−55.4 | $\Delta$=19.92 |

In the above tables and accompanying drawings, f is the focal length of the objective, the relative aperture is given in the usual way, $N_D$ is the index of refraction for the D line of the spectrum, $\nu$ is the dispersive index of the glass, $\Delta$ is the overall length of the lens, P is the Petzval sum for the whole lens, $P_2$ is the Petzval power for the second surface, $P_7$ is the Petzval power for the seventh surface, i. e., the cemented surface of the rear doublet, and the term "covering power" refers to half of the angle covered by the lens. Of course, covering power cannot be defined exactly since it is a matter of opinion when the definition of a lens falls off beyond what is tolerable. For that reason it is only given in degrees and not in fractions of a degree. The subscripts refer to the refractive surfaces and the elements of the lens in the usual way. Similarly the symbols R, t, s, are shown in the drawing and have their usual meaning.

Of the above eleven examples, Nos. 1, 4, and 10 are the preferred embodiments. While every one of the examples incorporate the preferred features wherein $\nu_I$ and $\nu_{II}$ are equal and the negative component is a single element having an index of refraction greater than 1.58, the main part of the invention is not concerned with these details but rather with the correction of the lower rim rays by holding $P_2\Delta$ within the limits defined. I see no objection and have found no difficulty in incorporating my invention into known lenses not having these preferred additional features.

Examples 1, 2, and 3 are similar to each other, the first two being extremely wide angle lenses and the third being a special lens for covering a normal field with absolutely no appreciable vignetting even at full aperture. It will be noted that even the extreme overall length of Example 3 does not affect $P_2\Delta$ which I have found to be the factor which controls lower rim rays. Example 1 differs from Example 2 merely by the inclusion in element V of a glass whose index is greater than 1.7. Of course lens IV is adjusted for chromatic correction etc., but the main point is that the introduction of high index glass in lens V reduces the astigmatism almost to zero without any loss of covering power.

Examples 4, 5, and 6 are also in a group of which Example 4 is the best. Example 5 has less covering power than Example 4 but this is accompanied by improved field and spherical aberration and hence better definition; however, Example 4 is already quite well corrected in these regards. Example 6 is slightly undercorrected for longitudinal color so that when used at finite conjugates as in an enlarger, better color results. Thus, Examples 5 and 6 are given to show how the introduction of various expedients for special purposes does not affect the invention.

The remaining Examples 7 to 11 also form a group which in some respects differs from Example 1 in the same way as Example 4 does. Of this third group, Examples 9 and 10 and particularly the latter are preferable.

Example 7 shows the application of the invention to an f/3.5 lens with normal covering power. Example 8 is only slightly different therefrom to adjust the curvature of field slightly. Both of these examples have $\nu_{IV}$ equal to $\nu_V$ as well as $\nu_I$ equal to $\nu_{II}$ but as before this is not essential. By introducing high index glass in lens V as shown in Example 9, the Petzval sum is reduced giving improved definition. This is the same general advantage as Example 1 has over Example 2. On the other hand if the Petzval sum is kept high by shifting the powers as shown in Example 10, increased covering power is obtained without any loss of definition. Thus the high index in element V gives either of two desirable results or part of both of such results if desired.

Example II is especially intended for long focal length lenses, but is not particularly suitable for short focal lengths because the elements would then be too thin at the edges for manufacturing convenience. In other words, the overall length of this lens is unusually small but it is included to illustrate the invention in such an unusual set-up. The reduction in the amount of glass used is of real importance in long focal length lenses. Thus various minor factors are involved in exactly the same way as they are in any lens design and in the present case they cause the slight variations in the value of $P_2\Delta$ but it still stays within the limits specified.

The following are specific limits on the radii of curvature of the refractive surfaces when readily available glasses are used and all the usual laws of lens design are obeyed. Obviously these limits are not a critical part of the invention but they do aid in defining specific lenses incorporating it.

All of the preferred embodiments given as Examples 1, 4, and 10 have $P_2\Delta$ between .006 and .016 preferably between .008 and .013, $P_7\Delta$ between .025 and .075, $R_1$ between $+.2f$ and $+.5f$ preferably between $+.25f$ and $+.45f$, $R_3$ greater than $-f$ and $+f$, (i. e., relatively flat whether positive or negative and greater than $-f$ if negative and greater than $+f$ if positive;—this defines the term "greater than" as used here with a positive and a negative quantity) and preferably greater than $-.2f$ and $+1.25f$, $R_4$ between $-.5f$ and $-f$, $R_5$ between $+.2f$ and $+.5f$ preferably between $+.24f$ and $+.45f$, $R_6$ greater than $-1.5f$ and $+1.5f$ preferably greater than $-3f$ and $+3f$ and $R_8$ between $-.3f$ and $-.75f$, preferably between $-.45f$ and $-.7f$.

Lenses according to the embodiment shown in Example 1 are further limited to having $P_2\Delta$ between .010 and .013, $R_1$ between $+.40f$ and $+.45f$, $R_3$ between $-2f$ and infinity, $R_4$ between $-.5f$ and $-.6f$, $R_5$ between $+.3f$ and $+.5f$, $R_6$ between $+1.5f$ and infinity and $R_8$ between $-.40f$ and $-.55f$.

The other two preferred embodiments both have $P_2\Delta$ between .008 and .013, $P_7\Delta$ between .027 and .045, $R_1$ between $+.25f$ and $+.35f$, $R_3$ between $+1.25f$ and infinity, $R_4$ between $-.55f$ and $-.9f$, $R_5$ between $+.24f$ and $+.3f$, $R_6$ greater than $-1.5f$ and $+.3f$ and $R_8$ is between $-.45f$ and $-.7f$. Of these second and third preferred embodiments the second one as shown in Example 4 is further limited to having $P_2\Delta$ greater than .010, $R_1$ less than $+.30f$, $R_3$ between $+2f$ and $+5f$, $R_4$ between $-.65f$ and $-.75f$, $R_6$ less than $+10f$ and $R_8$ greater than $-.6f$.

On the other hand the third preferred embodiment as shown in Example 10 is further limited to having $P_7\Delta$ between .030 and .045 preferably between .034 and .037, $R_1$ preferably greater than $+.3f$, $R_3$ preferably greater than $+5f$, $R_4$ preferably less than $-.75f$, $R_5$ preferably between $+.28f$ and $+.30f$, $R_6$ between $-1.5f$ and infinity and $R_8$ less than $-.6f$.

In all of these preferred embodiments the middle component is thin preferably not greater than 10% of the overall length.

Having thus described several preferred embodiments of my invention, I wish to point out that it is not limited to these particular lenses but is of the scope of the appended claims.

What I claim and desire to secure by Letters Patent of the United States is:

1. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_I)\Delta}{N_I N_{II} R_2}$$

is between .006 and .016 where $N_I$ and $N_{II}$ are respectively the indices of refraction of the positive and negative elements of the front doublet, $R_2$ is the radius of curvature of the cemented surface of this front doublet and is negative, and $\Delta$ is the overall axial length of the lens.

2. A lens according to claim 1 in which $$\frac{(N_{II}-N_I)\Delta}{N_I N_{II} R_2}$$

is between .008 and .013.

3. A lens according to claim 1 in which $$\frac{(N_V-N_{IV})\Delta}{N_{IV} N_V R_7}$$

is between .025 and .075 where $N_V$ and $N_{IV}$ are respectively the indices of refraction of the positive and negative elements of the rear doublet and $R_7$ is the radius of curvature of the cemented surface of this rear doublet.

4. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_I)\Delta}{N_I N_{II} R_2}$$

is between .008 and .013 and $$\frac{(N_V-N_{IV})\Delta}{N_{IV} N_V R_7}$$

is between .027 and .040 where $N_I$, $N_{II}$, $N_{IV}$ and $N_V$ are respectively the indices of refraction of the positive element of the front doublet, the negative element of the front doublet, the negative element of the rear doublet, and the positive element of the rear doublet, $R_2$ and $R_7$ are respectively the radii of curvature of the cemented surfaces of the front and rear doublets and are respectively negative and positive, and $\delta$ is the overall axial length of the lens.

5. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_I)\Delta}{N_I N_{II} R_2}$$

is between .008 and .016 and $$\frac{(N_V - N_{IV})(\Delta - t_5)}{N_{IV}N_V R_7}$$

is between .020 and .035 where $N_I$, $N_{II}$, $N_{IV}$ and $N_V$ are respectively the indices of refraction of the positive element of the front doublet, the negative element of the front doublet, the negative element of the rear doublet, the positive element of the rear doublet, $R_2$ and $R_7$ are respectively the radii of curvature of the cemented surfaces of the front and rear doublets and are respectively negative and positive, $\delta$ is the overall axial length of the lens and $t_5$ is the axial thickness of the positive element of the rear doublet.

6. A lens according to claim 1 in which the negative component comprises a negative element whose index of refraction is greater than 1.58.

7. A lens according to claim 1 in which the negative component consists of a single element.

8. A lens according to claim 1 in which the dispersive indices of the two elements of the front doublet are substantially the same.

9. A lens according to claim 1 in which the index of refraction of the positive element of the rear doublet is greater than 1.7.

10. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II} - N_I)\Delta}{N_I N_{II} R_2}$$

is between .006 and .016, $$\frac{(N_V - N_{IV})\Delta}{N_{IV}N_V R_7}$$

is between .025 and .075, $R_1$ is between $+.2f$ and $+.5f$, $R_3$ is greater than $-f$ and $+f$, $R_4$ is between $-.5f$ and $-f$, $R_5$ is between $+.2f$ and $+.5f$, $R_6$ is greater than $-1.5f$ and $+1.5f$ and $R_8$ is between $-.3f$ and $-.75f$, where f is the focal length of the lens, $\delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component, and the front, cemented and rear surfaces of the rear doublet, and are positive when convex, and negative when concave, to the front.

11. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II} - N_I)\Delta}{N_I N_{II} R_2}$$

is between .008 and .013, the negative component consists of a single element having an index of refraction greater than 1.58, the dispersive indices of the two elements of the front doublet are substantially equal, $$\frac{(N_V - N_{IV})(\Delta - t_5)}{N_{IV}N_V R_7}$$

is between .020 and .035, $R_1$ is between $+.25f$ and $+.45f$, $R_3$ is greater than $-2f$ and $+1.25f$, $R_4$ is between $-.5f$ and $-f$, $R_5$ is between $+.24f$ and $+.45f$, $R_6$ is greater than $-3f$ and $+3f$ and $R_8$ is between $-.45f$ and $-.7f$ where f is the focal length of the lens, $\delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component and the front, cemented and rear surfaces of the rear doublet and are positive when convex, and negative when concave, to the front.

12. A lens according to claim 11 in which $N_V$ is greater than 1.7.

13. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II} - N_I)\Delta}{N_I N_{II} R_2}$$

is between .010 and .013, the negative component consists of a single element having an index of refraction greater than 1.58, the dispersive indices of the two elements of the front doublet are substantially equal, $$\frac{(N_V - N_{IV})\Delta}{N_{IV}N_V R_7}$$

is between .025 and .075, $R_1$ is between $+.40f$ and $+.45f$, $R_3$ is between $-2f$ and infinity, $R_4$ is between $-.5f$ and $-.6f$, $R_5$ is between $+.3f$ and $+.5f$, $R_6$ is between $+1.5f$ and infinity, $R_8$ is between $-.40f$ and $-.55f$ where f is the focal length of the lens, $\Delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component and the front, cemented and rear surfaces of the rear doublet and are positive when convex, and negative when concave, to the front.

14. A lens according to claim 13 in which $N_V$ is greater than 1.7.

15. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_{I})\Delta}{N_{I}N_{II}R_{2}}$$

is between .008 and .013, the negative component consists of a single element having an index of refraction greater than 1.58, the dispersive indices of the two elements of the front doublet are substantially equal, $$\frac{(N_{V}-N_{IV})\Delta}{N_{IV}N_{V}R_{7}}$$

is between .027 and .045, $R_1$ is between $+.25f$ and $+.35f$, $R_3$ is between $+1.25f$ and infinity, $R_4$ is between $-.55f$ and $-.9f$, $R_5$ is between $+.24f$ and $+.3f$, $R_6$ is greater than $-1.5f$ and $+3f$, $R_8$ is between $-.45f$ and $-.7f$, where f is the focal length of the lens, $\Delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surface of the negative component and the front, cemented and rear surfaces of the rear doublet and are positive when convex, and negative when concave, to the front.

16. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_{I})\Delta}{N_{I}N_{II}R_{2}}$$

is between .010 and .013, the negative component consisting of a single element having an index of refraction greater than 1.58, the dispersive indices of the two elements of the front doublet are substantially equal $$\frac{(N_{V}-N_{IV})\Delta}{N_{IV}N_{V}R_{7}}$$

is between .027 and .045, $R_1$ is between $+.25f$ and $+.30f$, $R_3$ is between $+2f$ and $+5f$, $R_4$ is between $-.65f$ and $-.75f$, $R_5$ is between $+.24f$ and $+.3f$, $R_6$ is between $+3f$ and $+10f$, $R_8$ is between $-.6f$ and $-.7f$, where f is the focal length of the lens, $\Delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component and the front, cemented and rear surfaces of the rear doublet and are positive when convex, and negative when concave, to the front.

17. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_{I})\Delta}{N_{I}N_{II}R_{2}}$$

is between .008 and .013, the negative component consists of a single element having an index of refraction greater than 1.58, the dispersive indices of the two elements of the front doublet are substantially equal, $$\frac{(N_{V}-N_{IV})\Delta}{N_{IV}N_{V}R_{7}}$$

is between .030 and .045, $R_1$ is between $+.25f$ and $+.35f$, $R_3$ is between $+1.25f$ and infinity, $R_4$ is between $-.55f$ and $-.9f$, $R_5$ is between $+.24f$ and $+.3f$, $R_6$ is between $-1.5f$ and infinity, $R_8$ is between $-.45f$ and $-.6f$, where f is the focal length of the lens, $\Delta$ is the overall axial length of the lens, $N_I$, $N_{II}$, $N_{IV}$ and $N_V$ are respectively the indices of refraction of the positive element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component and the front, cemented and rear surfaces of the rear doublet and are positive when convex, and negative when concave, to the front.

18. A lens comprising a negative component spaced between two positive doublets, each of the doublets having a positive element cemented to a negative element, the negative element of each doublet being nearer the negative component, the cemented surface of each doublet being convex to the negative component, the positive element of each doublet having an index of refraction at least .025 greater than that of the negative element cemented thereto and in which $$\frac{(N_{II}-N_{I})\Delta}{N_{I}N_{II}R_{2}}$$

is between .008 and .013, the negative component consists of a single element having an index of refraction greater than 1.58, the dispersive indices of the two elements of the front doublet are substantially equal $$\frac{(N_{V}-N_{IV})\Delta}{N_{IV}N_{V}R_{7}}$$

is between .034 and .037, $N_V$ is greater than 1.7, $R_1$ is between $+.3f$ and $+.35f$, $R_3$ is between $+5f$ and infinity, $R_4$ is between $-.55f$ and $-.75f$, $R_5$ is between $+.28f$ and $+.30f$, $R_6$ is between $-.15f$ and infinity, $R_8$ is between $-.45f$ and $-.6f$ where f is the focal length of the lens, $\Delta$ is the overall axial length of the lens, $N_I$, $N_{II}$, $N_{IV}$ and $N_V$ are respectively the indices of refraction of the positive element of the front doublet, the negative element of the front doublet, the negative element of the rear doublet, and the positive element of the rear doublet, and $R_1$ to $R_8$ are respectively the radii of curvature of the front, cemented and rear surfaces of the front doublet, the front and rear surfaces of the negative component and the front, cemented and rear surfaces of the rear doublet and are positive when convex, and negative when concave, to the front.

FRED E. ALTMAN.

CERTIFICATE OF CORRECTION.

Patent No. 2,279,384. April 14, 1942.

FRED E. ALTMAN.

It is hereby certified that error appears in the printed specification of the above numbered patent requiring correction as follows: Page 2, second column, line 37, for "may" read --my--; page 3, second column, line 9, Example 2, for "3.2 mm." read --43.2 mm.--; and line 39, Example 4, for "1.661" read --1.611--; page 5, second column, line 61, claim 4, page 6, first column, line 13, claim 5, and line 50, claim 10, and second column, line 14, claim 11, for "$\delta$" read --$\Delta$--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.